United States Patent [19]

Playfoot et al.

[11] 4,182,176
[45] Jan. 8, 1980

[54] LIQUID LEVEL SENSOR WITH IMPROVED LINEARITY

[75] Inventors: Kerwin C. Playfoot, Horseheads; William H. Todt, Elmira Heights, both of N.Y.

[73] Assignee: Westinghouse Electric Corporation, Pittsburgh, Pa.

[21] Appl. No.: 699,272

[22] Filed: Jun. 24, 1976

[51] Int. Cl.² ............................................. G01F 23/28
[52] U.S. Cl. ............................... 73/290 R; 73/304 R; 336/30
[58] Field of Search ........................ 73/290 R, 304 R; 336/30, 208; 338/321; 242/118.61

[56] References Cited

U.S. PATENT DOCUMENTS

| 2,589,389 | 4/1952 | Hurst | 242/118.61 |
| 3,905,561 | 9/1975 | Ketch | 242/118.61 |
| 3,948,100 | 4/1976 | Paris et al. | 73/290 R |

Primary Examiner—S. Clement Swisher
Attorney, Agent, or Firm—W. G. Sutcliff

[57] ABSTRACT

A liquid level sensor of the bifilar wound inductive coil type is provided with improved end linearity characteristic. The coil ends are wound substantially to the end of a tubular support member, and a modified end support is provided at the support tube ends.

3 Claims, 5 Drawing Figures

LIQUID LEVEL SENSOR WITH IMPROVED LINEARITY

BACKGROUND OF THE INVENTION

The present invention relates to sensors for detecting the level of liquid in a container or chamber. More particularly, the present invention relates to inductive liquid level sensors of the type which utilize bifilar wound coils, one of which serves as the primary coil of a sensing system and the other of which is the pick-up or secondary coil for detecting the liquid level. Such inductive liquid level sensors typically utilize shielded cables which are wound side-by-side about a conductive tubular support with the grounded sheath of the cables being brazed to the support tube. This coil wound support tube is then inserted into a sealed thimble, which is then immersible into the liquid in the chamber in which the level is to be sensed. Such coils are typically used to measure liquid metal levels, such as sodium or potassium in a breeder reactor. A constant current is driven through the primary coil and the signal induced in the secondary coil is a function of the shunting of the secondary by the conductive liquid metal.

In the manufacture of such liquid metal level probes, the coil wound tube may extend for many feet which must then be insertable into the tubular thimble. It has been the practice to utilize a cap-like end support which fits over the extending end of the tubular support upon which the coils are wound. The end support acts as a guide during insertion of the coil wound tube into the thimble. Such prior art liquid level sensors have suffered from a lack of signal linearity at the extending ends of the sensor probe. This means that it is very difficult to determine whether the liquid metal containing chamber is completely empty at the bottom end of the chamber or completely full at the top of the chamber. This can have important safety ramifications because of the highly reactive nature of the liquid metals.

The cap-shaped end support members are relatively massive and are brazed to the exterior surface of the coil supporting tube so that the coils are spaced some distance from the actual end of the probe. The end supports effectively support the coil wound tube within the thimble in a rigid fashion.

It is desirable to be able to extend the range of signal linearity for the full length of the probe. This must be done while maintaining an effective end support for the coil wound tube within the thimble.

SUMMARY OF THE INVENTION

A liquid level sensor of the bifilar wound inductive coil type is provided with an improved end linearity characteristic. The coil is wound on a support sleeve having an end support member which includes a tubular end support portion, a part of which is fitted within and supported from the interior surface of the support sleeve. The end support includes a generally planar end portion disposed at the end of the tubular end support portion. The planar end portion extends beyond the support sleeve normal to the longitudinal axis of the tubular end support portion, and extends radially beyond the outside diameter of the bifilar coil on the support sleeve. The planar end portion is limited in diameter to a dimension less than the inside diameter of the tubular thimble within which the entire support sleeve is fitted.

DESCRIPTION OF THE PREFERRED EMBODIMENTS

Figure 1:
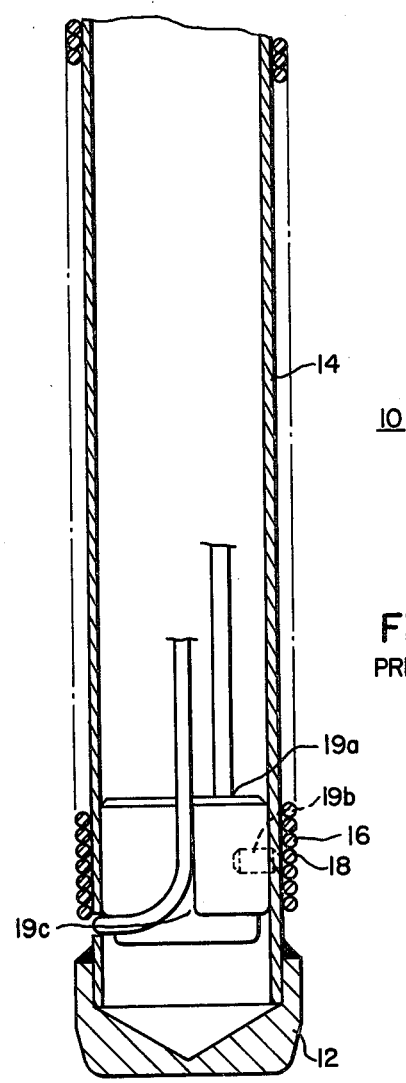
FIG. 1 is an elevational view, partly in section, of a prior art liquid metal level sensor.

The present invention is best understood by reference to the drawings. A prior art liquid level sensor and end support member is seen in FIG. 1. The bifilar wound inductive coil type liquid level sensor 10 of the prior art includes a cap-like end support member 12 fitted on the end of the tubular support rod 14 upon which the bifilar wound coils 16 and 18 are wound. The entire sensor 10 is fitted within a tubular thimble (not seen) which is closed at the end. An internal end guide 19a is typically disposed within the support sleeve 14 and a pin 19b holds it in place. The leads to coils 16 and 18 pass through an aperture provided through the support sleeve 14 and end guide 19a serves to keep the coils tight after they are wound on the sleeve during the brazing of the coil sheaths to the sleeve. The coil leads fit in slots 19c which extend along the end guide 19a. Such internal end guides 19a are provided within each end of the support sleeve.

Figure 2A:
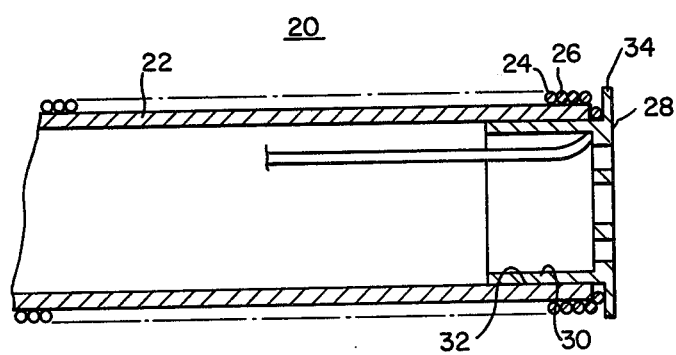
FIG. 2A is a side elevational view in section of the tubular support upon which the coil is wound and the end support member of the present invention.
Figure 2B:
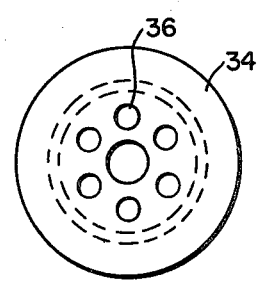
FIG. 2B is an end view of the end support member.

The liquid level sensor 20 seen in FIG. 2 includes the tubular support member 22, the bifilar wound coils 24 and 26 which are shielded cables with the sheath brazed to the conductive tubular support member 22. The end support member 28 comprises a tubular end support portion 30, part of which is fitted within and brazed to the interior wall 32 of the support sleeve 22. The end support member 28 includes a generally planar circular end portion 34 which extends from the tubular end support portion in a direction normal to the longitudinal axis of the tubular end support portion. The diameter of the circular, generally planar end portion 34 is greater than the outside diameter of the coils wound on the support sleeve, but is slightly less than the inside diameter of the tubular thimble to which the assembly is fitted. A plurality of apertures 36 is preferably provided in the planar end support portion so as to minimize the effect on the inductive loop at the end of the probe.

The circular, generally planar end portion 34 actually closely approximates the inside diameter of the tubular thimble within which it is inserted to provide a support means for the coil wound sleeve within the thimble which is not shown in FIG. 2.

Figure 3:
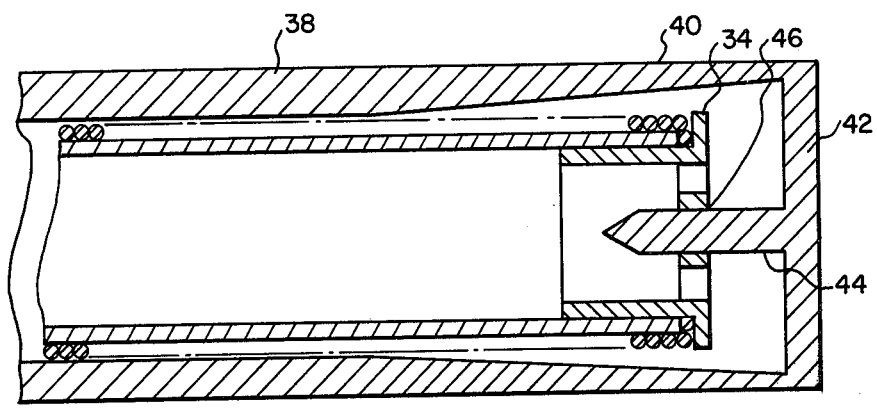
FIG. 3 is a sectional view of an alternative embodiment liquid level sensor according to the present invention.

In the embodiment of FIG. 3, the identical support sleeve and end support member as seen in FIG. 2 is included within a modified closed end tubular thimble 38. In this embodiment, the wall thickness at the end 40 of the tubular thimble is uniformly reduced over a predetermined length of the thimble end. This reduction in wall thickness of the thimble wall will reduce its shunting effect over the short length of reduced wall thickness at the end of the probe. This reduction in wall thickness will be such as to not adversely affect the mechanical strength of the thimble but will achieve improved probe end linearity. In this embodiment, the closed end 42 of the tubular thimble also includes an inwardly extending support rod 44 which fits within a central aperture 46 provided in the planar end support member 34. This support rod facilitates support of the end support member and sleeve within the thimble since the reduced wall thickness now permits the end support member to easily clear the inside diameter of the thimble.

Figure 4:
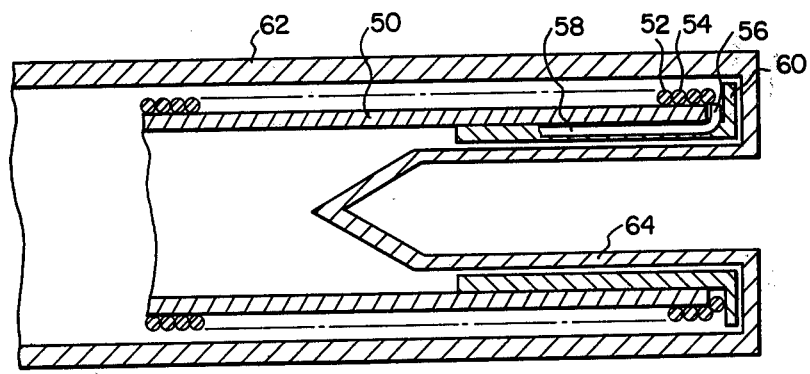
FIG. 4 is another alternative embodiment of the liquid level sensor per the present invention.

In the alternative embodiment seen in FIG. 4, the support sleeve 50 and coils 52 and 54 are as seen in the other embodiments, but a modified end support member 56 is provided in this embodiment. In this embodiment the end support member 56 is basically a tubular member 58 which is fitted within the inside diameter of the sleeve 50 and brazed thereto. An annular flange 60 is provided at the extending end of the tubular portion 58 beyond the sleeve 50. The annular flange 60 has an outside diameter which slightly exceeds the outside diameter of the coils wound on the sleeve and approximates the inside diameter of the tubular thimble 62 within which it is inserted. The closed end portion of the tubular thimble 62 is modified in this embodiment and includes a reduced diameter closed wall tubular portion 64 or pocket, which extends back coaxially within the thimble 62 a predetermined distance. This closed end tubular portion 64 is disposed coaxially within the tubular end support portion 50 of the end support member. In this way, the conductive liquid within which the thimble is immersed can fill the volume within the closed end thimble and also within the bifilar wound coils. This effectively increases the sodium reaction term to produce an increased linearity characteristic at the probe end. A vent tube may be provided to the closed end tubular portion 64 to prevent entrapment of any chamber gas in the pocket in order to facilitate sodium displacement into this closed end tubular portion.

In each of the embodiments seen it is desirable to improve the linearity characteristic over the extending ends of the liquid level probe for a distance approximately equal to about 1.5 coil diameters of the bifilar wound coils.

The internal end guides described above with respect to the prior art are also preferably disposed within the end of the support sleeve of the embodiments of the present invention. Such end guides may be fitted within the tubular portion 30 of the end support.

We claim:
1. A liquid level sensor of the bifilar wound inductive coil type in which the coil is wound on a support sleeve having an end support member connected to the sleeve end which is insertable into a closed end tubular thimble which is insertable into a conductive liquid which tubular thimble has a thinned wall portion proximate to the closed end, the improvement wherein the coil is wound to the end of the support sleeve, and the end support member comprises a tubular end support portion, part of which is fitted within and supported from the interior wall of the support sleeve, and a generally planar end portion disposed at the end of the tubular end support portion which extends from the support sleeve normal to the longitudinal axis of the tubular end support portion and extending radially beyond the outside diameter of the bifilar coil on the support sleeve but extends less than the inside diameter of the tubular thimble.

2. The sensor set forth in claim 1, wherein an alignment rod member extends from the center of the interior surface of the closed end along the thimble axis, which alignment member fits within a central aperture in the planar end portion of the end support.

3. A liquid level sensor of the bifilar wound inductive coil type in which the coil is wound on a support sleeve having an end support member connected to the sleeve end which is insertable into a closed end tubular thimble which is insertable into a conductive liquid, the improvement wherein the coil is wound to the end of the support sleeve, and the end support member comprises a tubular end support portion, part of which is fitted within and supported from the interior wall of the support sleeve, and a generally planar end portion disposed at the end of the tubular end support portion which extends from the support sleeve normal to the longitudinal axis of the tubular end support portion and extending radially beyond the outside diameter of the bifilar coil on the support sleeve but extends less than the inside diameter of the tubular thimble, wherein the planar end portion of the end support comprises a flange which extends radially outward from the end of the tubular end portion, and wherein the closed end of the thimble includes a reduced diameter tubular portion which extends back coaxially within the thimble, which tubular portion fits within the tubular end support portion, so that the conductive liquid within which the thimble end is immersed can be present within the volume about which the coil end is disposed.

* * * * *